(12) United States Patent
Bergmann et al.

(10) Patent No.: US 7,909,303 B2
(45) Date of Patent: Mar. 22, 2011

(54) MOVEMENT DEVICE

(75) Inventors: Andreas Bergmann, Lehre (DE);
Ruprecht Altenburger, Stuttgart (DE);
Peter Aul, Stuttgart (DE)

(73) Assignees: **DLR Deutsches Zentrum fur Luft -
und Raumfahrt E.V.**, Cologne (DE);
Peter Aul, Stuttgart (DE); **Ruprecht
Altenburger**, Stuttgart (DE)

( * ) Notice: Subject to any disclaimer, the term of this patent is extended or adjusted under 35 U.S.C. 154(b) by 534 days.

(21) Appl. No.: 11/165,434

(22) Filed: Jun. 24, 2005

(65) Prior Publication Data

US 2006/0254380 A1 Nov. 16, 2006

(30) Foreign Application Priority Data

Jun. 24, 2004 (DE) .................. 10 2004 030 659

(51) Int. Cl.
*F16M 13/00* (2006.01)
*B66C 23/00* (2006.01)

(52) U.S. Cl. ........ 248/605; 248/614; 248/661; 248/668; 414/681; 409/211

(58) Field of Classification Search .......... 248/580–583, 248/602, 603, 605, 614, 661, 668, 652; 414/680, 414/681, 696, 697, 730, 735, 699; 409/201, 409/211, 216, 225, 235; 408/234, 237; 74/490.03, 490.04, 490.05

See application file for complete search history.

(56) References Cited

U.S. PATENT DOCUMENTS

| | | | | |
|---|---|---|---|---|
| 6,099,217 | A * | 8/2000 | Wiegand et al. | 409/201 |
| 6,240,799 | B1 * | 6/2001 | Yau | 74/490.03 |
| 6,974,297 | B2 * | 12/2005 | Brogårdh | 414/680 |
| 6,976,821 | B2 * | 12/2005 | Zarske | 414/680 |
| 7,124,660 | B2 * | 10/2006 | Chiang | 74/490.05 |
| 2004/0052628 | A1 | 3/2004 | Thurneysen et al. | |
| 2006/0254380 | A1 * | 11/2006 | Bergmann et al. | 74/490.08 |

FOREIGN PATENT DOCUMENTS

| | | |
|---|---|---|
| DE | 198 40 886 C2 | 3/2000 |
| DE | 101 51 631 B4 | 5/2003 |
| EP | 0 868 255 B1 | 10/1998 |
| EP | 1 234 632 A1 | 8/2002 |

* cited by examiner

*Primary Examiner* — Tan Le
(74) *Attorney, Agent, or Firm* — Foley & Lardner LLP

(57) ABSTRACT

A movement device (1) having a Stewart platform includes a movable platform (9) that has platform joints (8) connecting it in an articulated manner by at least six rods (6) to a base (3). The rods (6) have base joints (7) resting in an articulated manner on carriages (4, 5) that can be displaced in the longitudinal direction on rails (2a, 2b) that are fixed to the base. Each carriage (4, 5) has a dedicated drive, and the carriages (4, 5) can be moved independently of one another. Exactly two rails (2a, 2b) are provided, and each rail (2a, 2b) supports at least three carriages (4a, 4b, 4c and 5a, 5b, 5c).

13 Claims, 4 Drawing Sheets

MOVEMENT DEVICE

CROSS-REFERENCE TO RELATED PATENT APPLICATIONS

The right of foreign priority is claimed under 35 U.S.C. §119(a) based on Federal Republic of Germany Application No. 10 2004 030 659.1, filed Jun. 24, 2004, the entire contents of which, including the specification, drawings, claims and abstract, are incorporated herein by reference.

BACKGROUND OF THE INVENTION

The invention relates to a movement device having a Stewart platform, in which a movable platform that has platform joints is connected in an articulated manner by at least six rods to a base. The rods have base joints and, at the base, rest in an articulated manner on carriages. The carriages can be displaced in the longitudinal direction of respective rails that are fixed to the base and extend parallel to one another. Each carriage has a dedicated drive, and the carriages can be moved independently of one another.

In particular, the invention relates to a movement device for positioning a model in the three translational and three rotational degrees of freedom relative to the free inflow of a wind tunnel. In this case, the model is held by a strut in a belly-strut or back-strut arrangement, such that the movement device is located outside the wind tunnel measurement section. This ensures that as little disturbance as possible is introduced into the measurement section. On account of the aerodynamic loads acting via the lever arm and the mass forces, the movement device must be optimized with regard to the greatest possible rigidity with the simultaneous limitation of the maximum drive force.

In many conventional wind tunnels, the suspension of a model in the rear-strut, belly-strut or back-strut arrangement is implemented in such a way that the strut for supporting the model is led out of the measurement section and is held by movement mechanisms arranged serially outside the flow.

The model suspension can likewise be carried out on wires, which in turn are held by a mechanism located outside the measurement section, in the manner of a marionette drive. Changing the position and spatial stabilization is then carried out by pulling on the wires counter to the force of gravity. Such mechanisms are not serial.

Furthermore, in order to implement periodic movements in the air stream to determine dynamic derivatives, strut suspensions are known which are constructed serially such that in each case one axis always respectively supports another. In the case of movements in three degrees of freedom, this already leads to a series connection of the large and heavy axis devices for the movements of the pitching, yawing and rolling, for example, of aircraft models. As a result of the serial, mutually independent axis arrangement of the mechanisms, one axis must always absorb the loads of all the axes arranged after it and must be dimensioned appropriately. As a result, volume and weight increase from axis to axis, and the flexibility of movement and the dynamics are highly restricted. In addition, the accuracy of serial arrangements is determined by the accuracies of the individual axes, because of the error propagation law, and is therefore always poorer than in the case of the respective individual axis. In addition, each individual component is constructed individually, so that the expenditure for fabrication and installation is relatively high.

EP 0 868 255 B1 discloses such a generic movement device for a machine tool or a manipulator. The platform to be moved can be moved in space relative to a base in up to three translational and three rotational degrees of freedom.

In the case of at least four carriages that can move independently of one another on parallel rails, in spite of the one-dimensional preferential direction, the movable platform not only can be moved linearly but can also be tilted. In this case, one of the rails is intended to support exactly two carriages.

Stewart platforms of this type have the advantage of great rigidity with low masses to be moved.

In DE 198 40 886 C2, movement device having a parallel structure is disclosed, in which five guide joint chains are driven by rotary motors. A sixth rod is provided independently thereof as a working spindle.

In EP 1 234 632 A1, a machine tool having four degrees of freedom is described, in which rods in parallelogram arrangements are supported on carriages. Two rails are provided, one rail supporting one carriage and the other rail supporting three carriages. Crossing the rods leads to the linkage of degrees of freedom.

In EP 0 868 255 B1, a movement device having three rails is provided in order to move a body in three to six degrees of freedom.

In DE 101 51 631 B4, a movement device having four rails is provided, each of which supports two carriages. The carriages are aligned parallel to one another and are physically opposite each other, so that they cover a rectangle.

The problem with such Stewart platforms is to provide a degree of rigidity which is constant in virtually all movement situations.

SUMMARY OF THE INVENTION

It is therefore an object of the invention to provide an improved movement device.

According to one aspect of the invention, there is provided a movement device having a Stewart platform that can move with six degrees of freedom, comprising: a platform; a base; exactly two rails that are fixed to the base and extend parallel to one another; at least three carriages, each of which has a dedicated drive that can be moved independently of one another, said carriages being carried on each rail so as to be displaceable in the longitudinal direction of the respective rail; and at least six rods, wherein each carriage supports at least one of the rods in an articulated manner on the carriage at base joints, and each rod is connected in an articulated manner to the platform at platform joints.

Further objects, features and advantages of the present invention will become apparent from the detailed description of preferred embodiments that follows, when considered together with the accompanying figures of drawing.

DETAILED DESCRIPTION OF THE PREFERRED EMBODIMENTS

Figure 1:
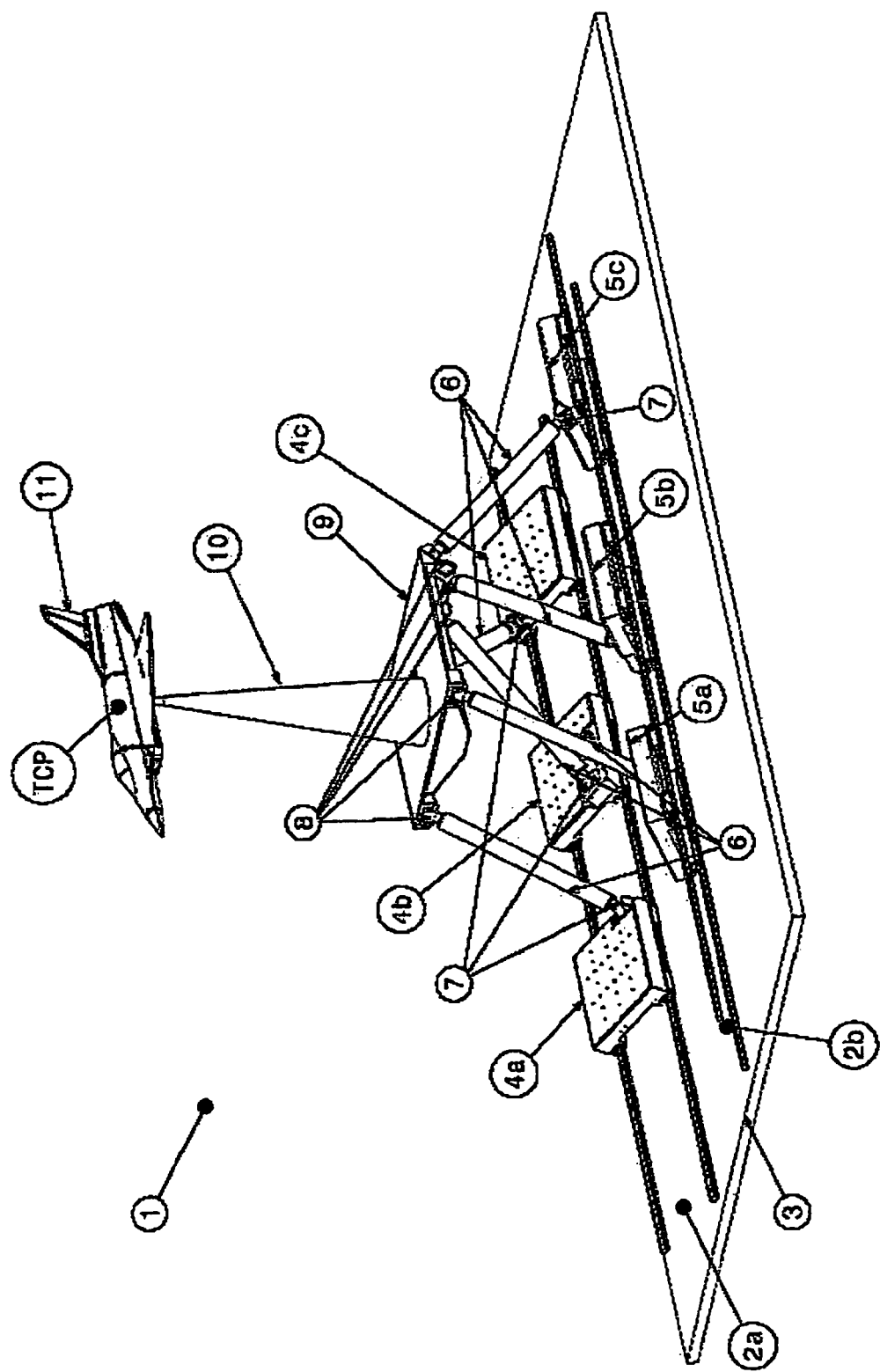
FIG. 1 is a perspective view showing a movement device having two rails, each of which supports three carriages.

The invention improves the movement device of the generic type by providing exactly two rails, whereby each rail supports at least three carriages. At least six rods are provided, and each carriage supports at least one of the rods.

It has been shown that, in reducing the movement device to two rails in which each rail supports at least three carriages, the rigidity of the system can be improved, and dynamic movement in all six degrees of freedom is possible. This applies, in particular, to kinematics at the tool center point above a strut on the movable platform. Surprisingly, in spite of the concentration of at least three carriages on one of two rails, in each case, these kinematics are not restricted.

The parallel connection of the carriage drives likewise reduces the error propagation considerably, and it is even possible in the ideal case for errors in the individual carriage drives to compensate for one another.

For straightness and flatness, it is necessary for only two linear guides together with a distance measuring system to be aligned in each case. In this case, the linear guides can be skewed in relation to each other. All the other components are installed without particular accuracy requirements, since the possible deviations arising on them can be compensated for by calibration methods. This leads to a considerably reduced expenditure for fabrication and installation.

It is particularly advantageous if at least two rods assigned to a common rail cross three-dimensionally, i.e., in the front view and side view of the platform, at least one crossing point between mutually crossing rods is visible. Thus, for example, the rear rods supported on a rear carriage on a rail can be attached to the platform in front of the point of attachment of the central rods supported by the central rail. This means that, for each rail, the central and rear rods cross. In this way, the necessary installation space can be minimized, with the same movement space and at least the same rigidity.

It is particularly advantageous if the rails are inclined toward each other at an acute angle of inclination $\alpha$ of, for example, 26°, to the base plane. In this way, the rigidity and the dynamic movement behavior can be improved further.

Furthermore, it is advantageous if the base joints for supporting the rods on the carriages on a common rail are arranged to be offset laterally at a different distance from the longitudinal axis of the rail. By fixing the joints at different positions on the carriage, the kinematics can be improved further.

Furthermore, it is advantageous if at least one platform joint of the rods assigned to a common rail is arranged on a different plane from the other platform joints on the movable platform. This arrangement can have advantages concerning the kinematics and rigidity with reference to the tool center point above the movable platform.

The rods are preferably rigid and, in a particular embodiment, can also have their lengths varied. In this way, further possible movements are provided, but with a reduction in the rigidity.

The platform is preferably provided to support a model for a wind tunnel, but can also be used for machine tools or the like.

Turning now to the drawings, FIG. 1 depicts a movement device 1 having exactly two rails 2a, 2b running parallel to each other, which are firmly connected to a flat base 3. Each of the rails 2a, 2b supports carriages 4a, 4b, 4c and 5a, 5b, 5c which are arranged such that they can each be selectively and independently displaced in the longitudinal direction of the respective rail 2a, 2b.

On each carriage 4a, 4b, 4c and 5a, 5b, 5c a rod 6 is connected in a rotary-jointed manner to a base joint 7. At the other end, the rods 6 are in each case connected in a rotary-jointed manner by platform joints 8 to a movable platform 9.

By means of the displacement of the individual carriages 4a, 4b, 4c and 5a, 5b, 5c in the longitudinal direction of the rails 2a, 2b, the platform 9 can be moved dynamically in all degrees of freedom.

In the embodiment of the movement device 1 illustrated, the platform 9 supports a strut 10, on which, for example, an aircraft model 11 is fixed for wind-tunnel investigations. The kinematics of the movement device are in this case designed for a tool center point TCP at the upper end of the strut 10. The center of gravity of the aircraft model 11 in this case remains substantially unchanged. The pivoting angles in the three spatial directions X, Y and Z allow the simulation of virtually any desired steering maneuvers of the aircraft model 11. In this case, very dynamic flying maneuvers with accelerations of up to 2.5 G and more are possible and can be controlled very accurately. The rigidity of the movement device 1 is relatively constant, and the first inherent frequency is relatively high.

Figure 2:
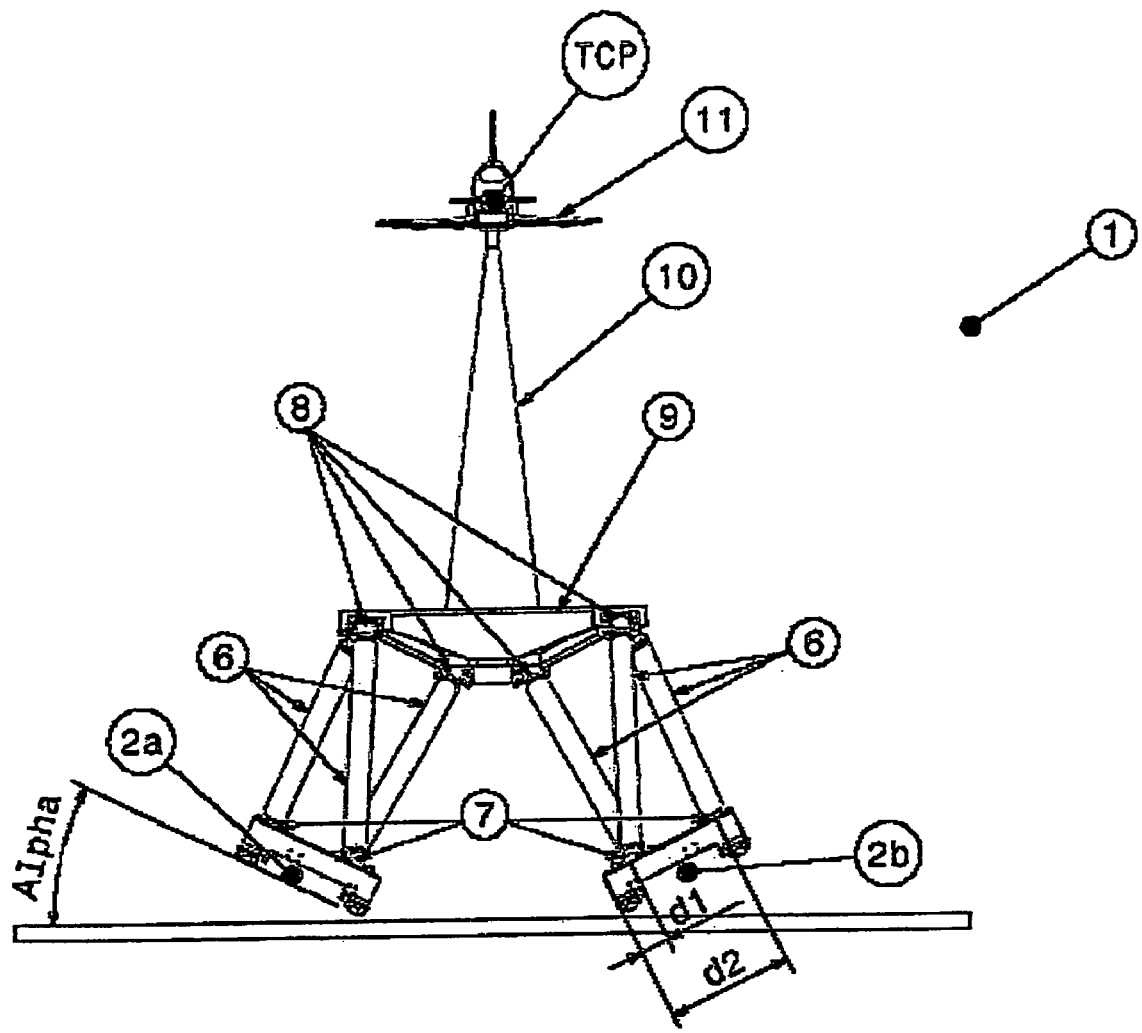
FIG. 2 is a front view of the movement device of FIG. 1.

FIG. 2 depicts the front view of the movement device 1 of FIG. 1. It becomes clear in particular that the carriages 2a, 2b are inclined toward each other at an angle of inclination $\alpha$ to the base plane 3.

Furthermore, it is clear that the base joints 7 of the carriages 4a, 4b, 4c and 5a, 5b, 5c of a common rail 2a or 2b are arranged to be offset laterally at a different distance d1, d2 with respect to the longitudinal axis of the respective rail 2a, 2b.

Furthermore, it can be seen that the central platform joints 8b are arranged on a lower plane of the platform 9 than the front and rear platform joints 8a and 8c.

Figure 3:
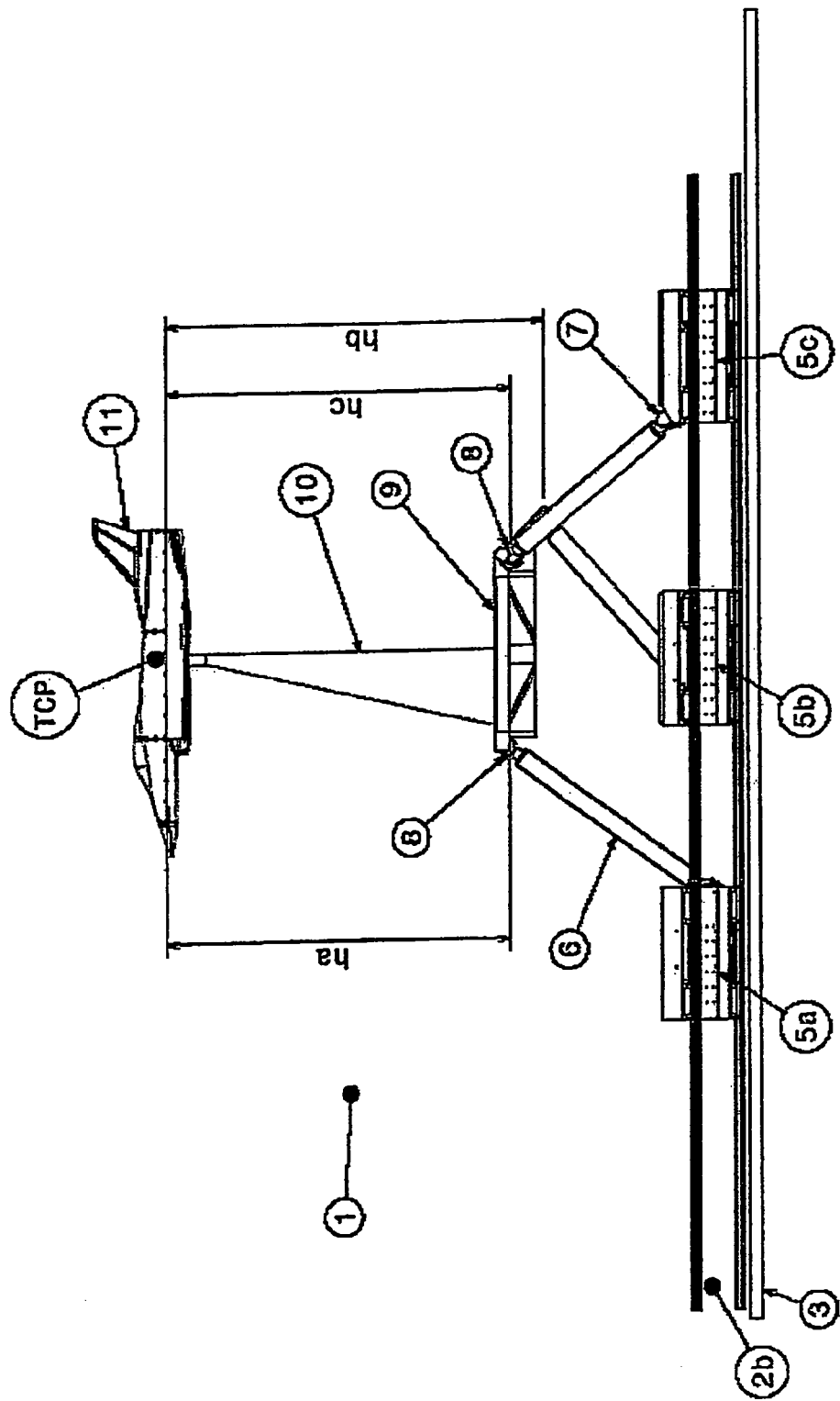
FIG. 3 is a side view of the movement device of FIG. 1.

FIG. 3 is a side view of the movement device 1 of FIG. 1. It becomes clear once more that the central platform joints 8b are lower in relation to the front and rear platform joints 8a and 8c, based on the plane of the platform 9 or based on a plane perpendicular to the strut 10 and running through the tool center point TCP. The distance from this plane is designated ha in FIG. 3 for the front platform joints, hb for the central platform joints 8b and hc for the rear platform joints 8c. Here, ha<hc<hb.

Moreover, it can be seen that the two rear rods 6 are oriented forward and the front and center rods 6 are oriented rearward. The platform joint 8b of the central rods 6 is lowest, as explained above, based on the plane through the tool center point or the platform 9.

The platform joints 8b for the central rods 6, as viewed in the longitudinal direction of the rails 2, are in this case located behind the platform joints 8c, mounted in front in this regard, of the rear legs 6.

Figure 4:
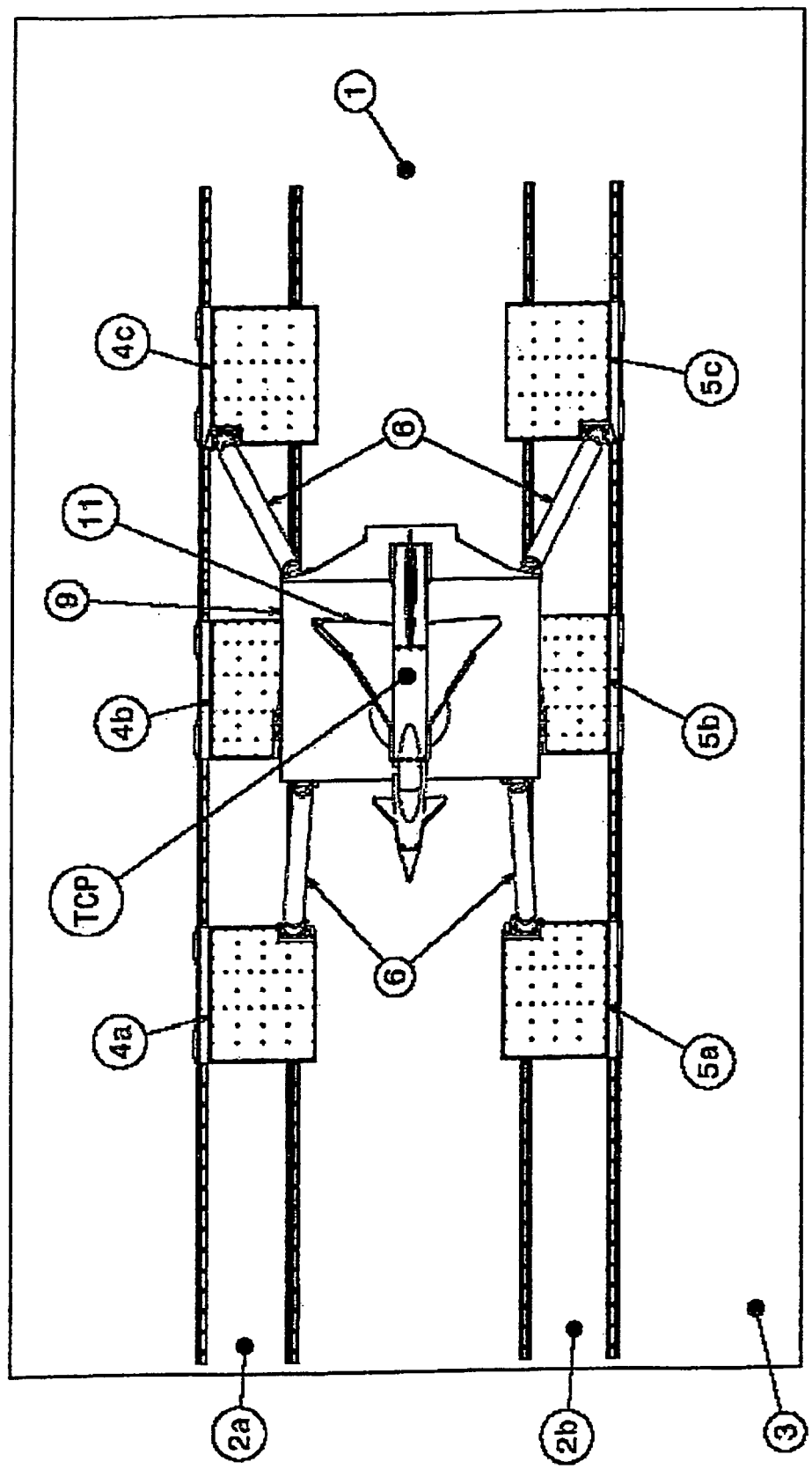
FIG. 4 is a plan view of the movement device of FIG. 1.

FIG. 4 reveals a plan or top view of the above-described movement device. It becomes clear again that exactly two rails 2a, 2b are provided, which run parallel to each other and in each case support three carriages 4a, 4b, 4c and 5a, 5b, 5c.

Furthermore, it becomes clear that the platform joints 8b of the central rods 6, as viewed from left to right in the longitudinal direction of the carriages 2a, 2b, are located behind the platform joints 8c of the rear rods 6.

The foregoing description of preferred embodiments of the invention has been presented for purposes of illustration and description only. It is not intended to be exhaustive or to limit the invention to the precise form disclosed, and modifications and variations are possible and/or would be apparent in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto and that the claims encompass all embodiments of the invention, including the disclosed embodiments and their equivalents.

What is claimed is:

1. A movement device having a Stewart platform that can move with six degrees of freedom, comprising:
   a platform;
   a base;
   a plurality of rail systems, wherein the plurality of rail systems consists of two rail systems, wherein each rail system includes rails that are fixed to the base and extend parallel to each other;
   a plurality of carriages, each of which has a dedicated drive that can be moved independently of one another, said carriages being carried on the rails so as to be displaceable in a longitudinal direction of a respective rail, wherein each rail system supports at least three carriages;
   wherein the carriages of each rail system are supported by the same rails within each rail system along a single line; and
   at least six rods, wherein each carriage pivotably supports at least one of the rods on the carriage at base joints, each rod being pivotably connected to the platform at platform joints.

2. A movement device having a Stewart platform that can move with six degrees of freedom, comprising:
   a platform;
   a base;
   a plurality of rails, wherein the plurality of rails includes no more than two rails that are fixed to the base and extend parallel to another;
   a plurality of carriages, each of which has a dedicated drive that can be moved independently of one another, said carriages being carried on a dedicated one of the two rails so as to be displaceable in the longitudinal direction of the respective rail, wherein each rail of the two rails supports at least three carriages;
   wherein the carriages of each rail are supported by the same rail along a single line; and
   at least six rods, wherein each carriage pivotably supports at least one of the rods on the carriage at base joints, each rod being pivotably connected to the platform at platform joints;
   wherein at least two rods are supported on the same rail and the at least two rods cross each other.

3. A movement device having a Stewart platform that can move with six degrees of freedom, comprising:
   a platform;
   a base;
   a plurality of rail systems, wherein the plurality of rail systems consists of two rail systems, wherein each rail system includes rails that are fixed to the base and extend parallel to each other;
   a plurality of carriages, each of which has a dedicated drive that can be moved independently of one another, said carriages being carried on the rails so as to be displaceable in a longitudinal direction of a respective rail, wherein each rail system supports at least three carriages; and
   at least six rods, wherein each carriage pivotably supports at least one of the rods on the carriage at base joints, each rod being pivotably connected to the platform at platform joints;
   wherein the rail systems are inclined toward each other at an angle of inclination $\alpha$ to a base plane.

4. A movement device having a Stewart platform that can move with six degrees of freedom, comprising:
   a platform;
   a base;
   a plurality of rail systems, wherein the plurality of rail systems consists of two rail systems, wherein each rail system includes rails that are fixed to the base and extend parallel to one another;
   at least three carriages, each of which has a dedicated drive that can be moved independently of one another, said carriages being carried on the rails so as to be displaceable in a longitudinal direction of a respective rail, wherein each rail system supports at least three carriages;
   wherein the carriages of each rail system are supported by the same rails within each rail system along a single line; and
   at least six rods, wherein each carriage supports at least one of the rods on the carriage at base joints, and each rod is connected to the platform at platform joints;
   wherein the base joints for supporting at least three rods on the carriages are carried on a same rail system and are arranged to be offset laterally at a different distance from a longitudinal axis of the same rail system.

5. A movement device having a Stewart platform that can move with six degrees of freedom, comprising:
   a platform;
   a base;
   a plurality of rail systems, wherein the plurality of rail systems consists of two rail systems, wherein each rail system includes two rails that are fixed to the base and extend parallel to one another;
   at least three carriages, each of which has a dedicated drive that can be moved independently of one another, said carriages being carried on the rails so as to be displaceable in a longitudinal direction of a respective rail, wherein each rail system supports at least three carriages;
   wherein the carriages of each rail system are supported by the same rails within each rail system along a single line; and
   at least six rods, wherein each carriage supports at least one of the rods on the carriage at base joints, and each rod is connected to the platform at platform joints;
   wherein at least one platform joint of the rods is arranged on a different plane from other platform joints on the platform, wherein the at least one platform joint and the other platform joints are supported by a same rail system.

6. A movement device having a Stewart platform that can move with six degrees of freedom, comprising:
   a platform;
   a base;
   a plurality of rail systems, wherein the plurality of rail systems consists of two rail systems, wherein each rail system includes two rails that are fixed to the base and extend parallel to one another;
   at least three carriages, each of which has a dedicated drive that can be moved independently of one another, said carriages being carried on the rails so as to be displaceable in a longitudinal direction of a respective rail, wherein each rail system supports at least three carriages;
   wherein the carriages of each rail system are supported by the same rails within each rail system along a single line; and at least six rods, wherein each carriage supports at least one of the rods on the carriage at base joints, and each rod is connected to the platform at platform joints;

wherein at least one of the rods has a different length than lengths of other rods.

7. The movement device as claimed in claim 1, wherein exactly six rods are provided.

8. The movement device as claimed in claim 1, further comprising a support for a model for a wind tunnel, mounted on the platform.

9. The movement device as claimed in claim 1, further comprising a mounting device for a machine tool, attached to the platform.

10. The movement device as claimed in claim 1, wherein each rail system consists of two rails.

11. The movement device as claimed in claim 4, wherein each rail system consists of two rails.

12. The movement device as claimed in claim 5, wherein each rail system consists of two rails.

13. The movement device as claimed in claim 6, wherein each rail system consists of two rails.

* * * * *